United States Patent
Van Hunsel et al.

(10) Patent No.: US 12,325,546 B2
(45) Date of Patent: Jun. 10, 2025

(54) MANUFACTURING OF PACKAGING

(71) Applicant: Agfa NV, Mortsel (BE)

(72) Inventors: Johan Van Hunsel, Mortsel (BE); Eddy DeDobbeleer, Mortsel (BE)

(73) Assignee: Agfa NV, Mortsel (BE)

( * ) Notice: Subject to any disclaimer, the term of this patent is extended or adjusted under 35 U.S.C. 154(b) by 293 days.

(21) Appl. No.: 17/605,830

(22) PCT Filed: Apr. 15, 2020

(86) PCT No.: PCT/EP2020/060524
§ 371 (c)(1),
(2) Date: Oct. 22, 2021

(87) PCT Pub. No.: WO2020/216654
PCT Pub. Date: Oct. 29, 2020

(65) Prior Publication Data
US 2022/0212827 A1    Jul. 7, 2022

(30) Foreign Application Priority Data

Apr. 25, 2019    (EP) .................................... 19171083

(51) Int. Cl.
*B65B 59/02* (2006.01)
*B41M 5/00* (2006.01)
(Continued)

(52) U.S. Cl.
CPC ............ *B65B 59/02* (2013.01); *B41M 5/0047* (2013.01); *B65B 5/024* (2013.01); *B65B 61/26* (2013.01);
(Continued)

(58) Field of Classification Search
CPC ......... B31B 50/88; B31B 50/25; B31B 50/20; B31B 50/006; B65B 5/024; B65B 59/02;
(Continued)

(56) References Cited

U.S. PATENT DOCUMENTS 6,090,027 A    7/2000 Brinkman
9,063,504 B2 *  6/2015 Liu ...................... B41J 11/0015
(Continued)

FOREIGN PATENT DOCUMENTS

EP    1352830 A1    10/2003
EP    1847396 A1 *  10/2007 ............ B41J 11/008
(Continued)

OTHER PUBLICATIONS

European Patent Office, International Search Report in International Patent Application No. PCT/EP2020/060524, mailed Dec. 11, 2020.
(Continued)

*Primary Examiner* — Thomas M Wittenschlaeger
*Assistant Examiner* — Himchan Song
(74) *Attorney, Agent, or Firm* — Leydig, Voit & Mayer, Ltd.

(57) ABSTRACT

Method of manufacturing a packaging box (8) including the steps of: a) determining minimal packaging box dimensions based on outer dimensions of one or more merchandise articles (19) to be packaged into the packaging box; b) digitally printing an image according to the minimal packaging box dimensions on packaging material (1), such as corrugated card board; and c) cutting and creasing the packaging box from the packaging material according to the minimal packaging box dimensions. A manufacturing line for packaging boxes of different dimensions is also disclosed.

11 Claims, 4 Drawing Sheets

(51) Int. Cl.
  *B65B 5/02* (2006.01)
  *B65B 61/26* (2006.01)
  *G06K 7/14* (2006.01)
  *G06Q 10/0833* (2023.01)

(52) U.S. Cl.
  CPC ......... *G06K 7/1413* (2013.01); *G06K 7/1417* (2013.01); *B65B 2210/04* (2013.01); *G06Q 10/0833* (2013.01)

(58) Field of Classification Search
  CPC ..... B65B 61/26; B65B 2210/04; B65B 61/02; B65B 61/025; B65B 59/001; B41M 5/0047; B41M 7/0036; B41M 7/009; G06K 7/1413; G06K 7/1417; G06Q 10/0833
  See application file for complete search history.

(56) References Cited

U.S. PATENT DOCUMENTS

| | | |
|---|---|---|
| 2001/0006090 A1 | 7/2001 | Brinkman |
| 2006/0073417 A1 | 4/2006 | Hermesdorf |
| 2010/0328957 A1 | 12/2010 | Hessing |
| 2018/0215117 A1* | 8/2018 | De Boer ............... B65B 61/025 |
| 2022/0176670 A1* | 6/2022 | Tanaka .................. B65B 57/12 |

FOREIGN PATENT DOCUMENTS

| | | |
|---|---|---|
| EP | 2697124 B1 | 5/2015 |
| EP | 2951099 B1 | 6/2016 |
| EP | 3354581 A1 | 8/2018 |
| KR | 20040044282 A | 5/2004 |
| WO | WO 2016/203343 A1 | 12/2016 |
| WO | WO 2017/131720 A1 | 8/2017 |
| WO | WO 2018/190139 A1 | 10/2018 |
| WO | WO-2019072733 A1 * | 4/2019 ........... B32B 27/304 |

OTHER PUBLICATIONS

European Patent Office, Written Opinion in International Patent Application No. PCT/EP2020/060524, mailed Dec. 11, 2020.

* cited by examiner

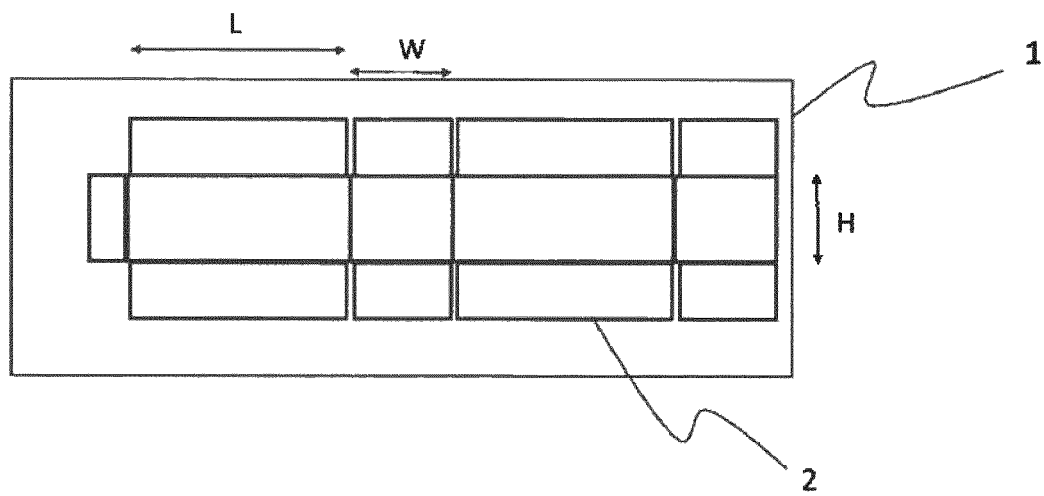
Fig. 1.A
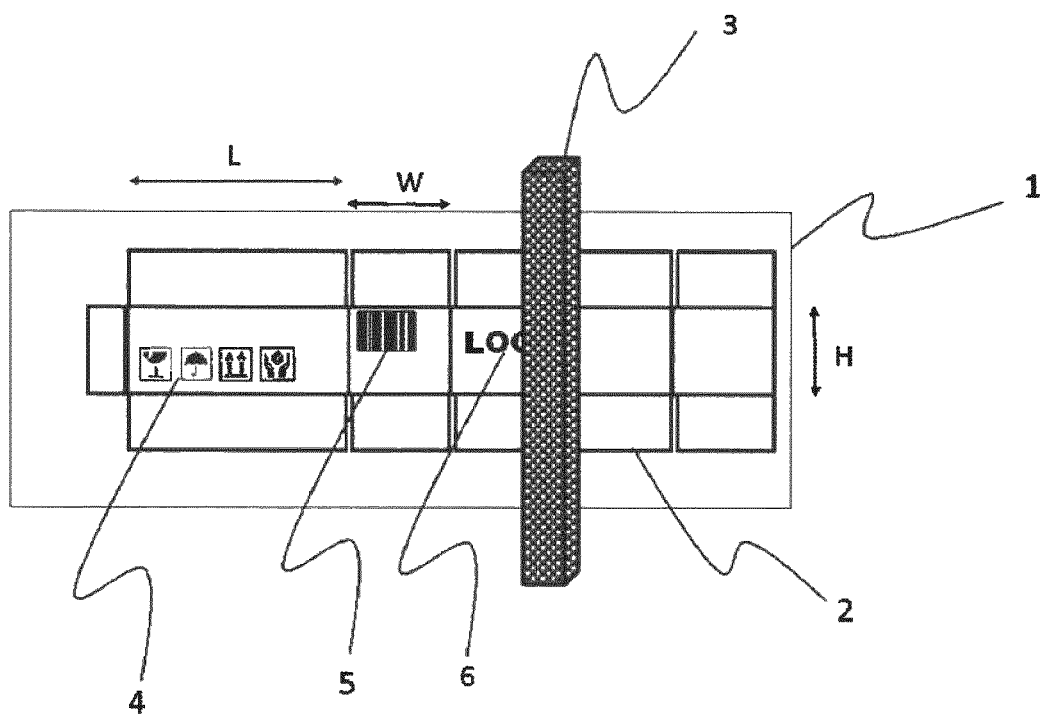
Fig. 1.B

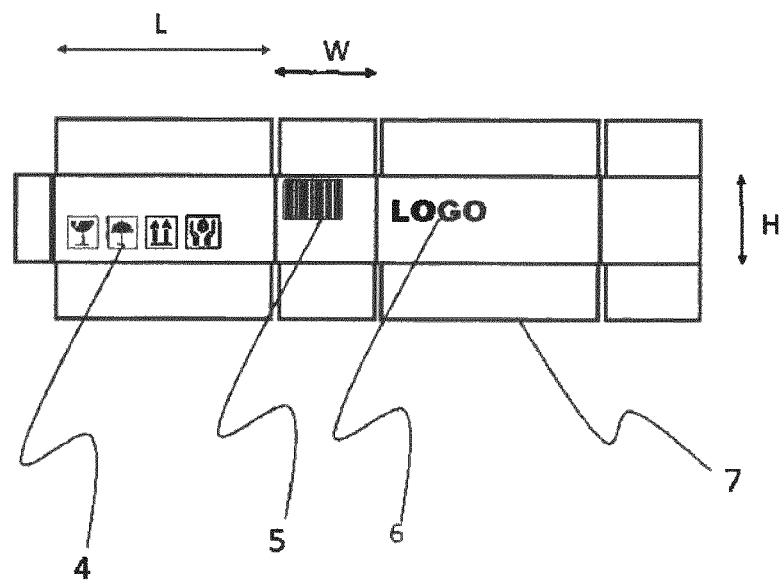
Fig. 1.C
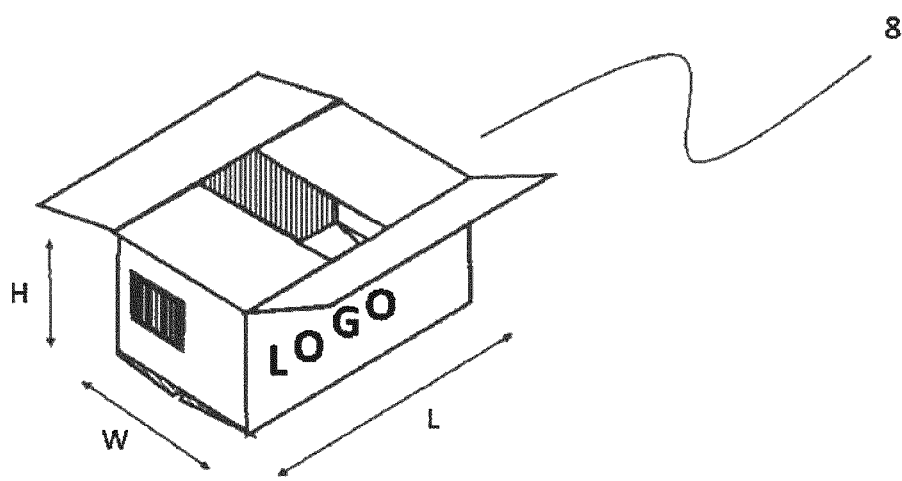
Fig. 1.D

MANUFACTURING OF PACKAGING

CROSS-REFERENCE TO RELATED APPLICATIONS

This patent application is a U.S. National Phase application of International Patent Application No. PCT/EP2020/060524, filed Apr. 15, 2020, which claims the benefit of European Patent Application No. 19171083.9, filed Apr. 25, 2019.

TECHNICAL FIELD

The present invention relates to the manufacturing of packaging boxes for e-commerce systems.

BACKGROUND ART

The role of e-commerce is becoming more and more significant in retail. Customers are increasingly placing orders online from the comfort of their homes via a retailer's website. The ordered merchandise is then put into a packaging box and delivered by a delivery vehicle to the customer's residence or another desired address. In this manner, a customer can conveniently make a purchase without having to devote time and effort to physically travel to a store to look for the desired merchandise, if available.

Merchandise articles come in different dimensions requiring the package shipping center of the e-commerce facility to have a large stock of packaging boxes in different sizes. This does not only come at an economical cost, but also causes logistic problems inside the shipping center. Furthermore, even with a large variety in predetermined dimensions of packaging boxes, significant free space generally remains in the packaging box containing one or more merchandise articles. This free space, frequently filled up with a cheap filler material, results in inefficient shipping as fewer packaging boxes can be loaded into a delivery vehicle.

For reducing the packaging costs, machines have been developed to manufacture customized packaging boxes, so-called 'box-on-demand' systems. Such 'box-on-demand' packaging machines are exemplified by WO2016/203343 A (PANOTEC) and EP 2697124 A (BOSCH).

However, these 'box-on-demand' systems do not solve all the logistics problems in a shipping center. Another problem often encountered is a package with a missing label, a package with a damaged or unreadable label and even mislabeled packages.

Also the competition between e-commerce companies is fierce and these companies are investigating ways to enhance customer experience and customer engagement.

Accordingly, it is desirable to develop an approach in which e-commerce companies can deliver packages in a more efficient and economical way, while at the same time having the option to enhance customer experience and customer engagement.

SUMMARY OF INVENTION

In order to overcome the problems described above, preferred embodiments of the present invention have been realized with a method of manufacturing a packaging box as defined in claim 1.

It was found that by digitally printing on a packaging material before cutting a customized packaging box from the packaging material solved many logistics problems, while at the same time obtaining a cost reduction due to less stock of the packaging material and smaller transportation costs.

These and other objectives will become apparent from the detailed description hereinafter.

BRIEF DESCRIPTION OF DRAWINGS

FIG. 1.A illustrates how for manufacturing a packaging box with a length L, a width W and a height H, a packaging box layout 2 may be fitted in an imaginary way onto a sheet of packaging material 1.

FIG. 1.B illustrates the inkjet printing of warning pictograms 4, a machine readable code 5 and a company logo 6 by a single pass inkjet printer 3 onto specific areas of the packaging material 1 by taking into account the packaging box dimensions. Optionally the packaging box layout may also be inkjet printed onto the packaging material 1.

FIG. 1.C illustrates the unassembled inkjet printed packaging box 7 obtained after cutting and creasing the inkjet printed packaging material.

FIG. 1.D illustrates the assembled inkjet printed packaging box 8 making use of, for example, glue or tape to assemble it.

DESCRIPTION OF EMBODIMENTS

Manufacturing Methods

Figure 2:
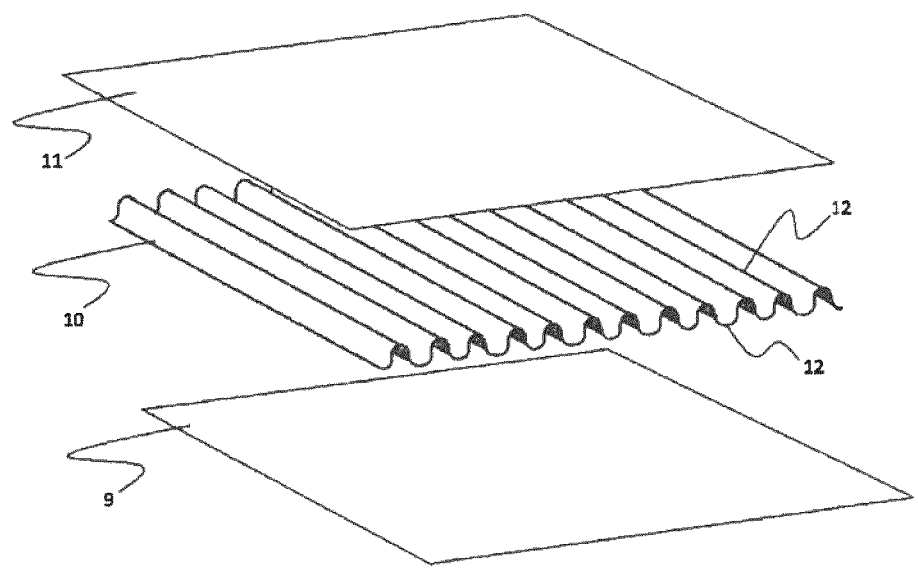
FIG. 2 illustrates the composition of a packaging material suitable for the invention formed by gluing a paper fluting medium 10 with glue 12 to a paper inner liner 9 and a paper outer liner 11.

In a preferred embodiment of the invention, the method of manufacturing a packaging box includes the steps of: a) determining minimal packaging box dimensions based on outer dimensions of one or more merchandise articles 19 to be packaged into the packaging box; b) digitally printing an image according to the minimal packaging box dimensions on packaging material 1, such as corrugated card board; and c) cutting and creasing the packaging box from the packaging material according to the minimal packaging box dimensions.

The minimal packaging box dimensions are determined based on the outer dimensions of one or more merchandise articles to be packaged into the packaging box. They can be determined just prior to performing step b), for example by scanning the outer dimensions of a merchandise article or the outer dimensions of a compact arrangement of multiple merchandise articles. The compact arrangement is preferably optimized so that the packaging box dimensions are minimized.

However, in a more preferred embodiment the outer dimensions of the one or more merchandise articles have been determined previously and are digitally stored in a database of a computer server. When needed the outer dimensions of a merchandise article are retrieved from the database in order to perform step a) of the manufacturing method. When multiple merchandise articles are to be packed into a single packaging box, then a computer first calculates what the minimal packaging dimensions are needed for an optimized compact arrangement of the multiple merchandise articles in the packaging box. The calculated minimal packaging box dimensions are then the minimal packaging box dimensions used in step a). Preferably, the optimized compact arrangement of the multiple merchandise articles to be included in the packaging box is visualized by an image digitally printed on the packaging material. The latter allows to gain time by the person arranging the merchandise articles in the assembled packaging box.

In the step b) of the manufacturing method, an image is digitally printed on packaging material taking into account the minimal packaging box dimensions, so that the image is optimally positioned on the finished packaging box. For example, if the image contains a bar code or a QR code, then this machine readable code is preferably positioned on a single flat surface of the final packaging box. Positioning it, for example, half on a side surface and half on a top surface could create difficulties when scanning the machine readable code.

There is no real limitation on the content of the image. The image may be purely decorative or it may contain information e.g. in the form of alphanumeric data, such as text, or machine readable codes, or combinations thereof. An example of text may be the destination address of the packaging box containing the one or more merchandise articles. By digitally printing this or other information on the packaging box, multiple issues are solved which occur with adhesive labels, such as a package with a missing label or a mislabeled package. Problems with damaged or unreadable labels can be solved by printing the information, e.g. a machine readable code, multiple times on different outer surfaces of the packaging box.

Figure 3:
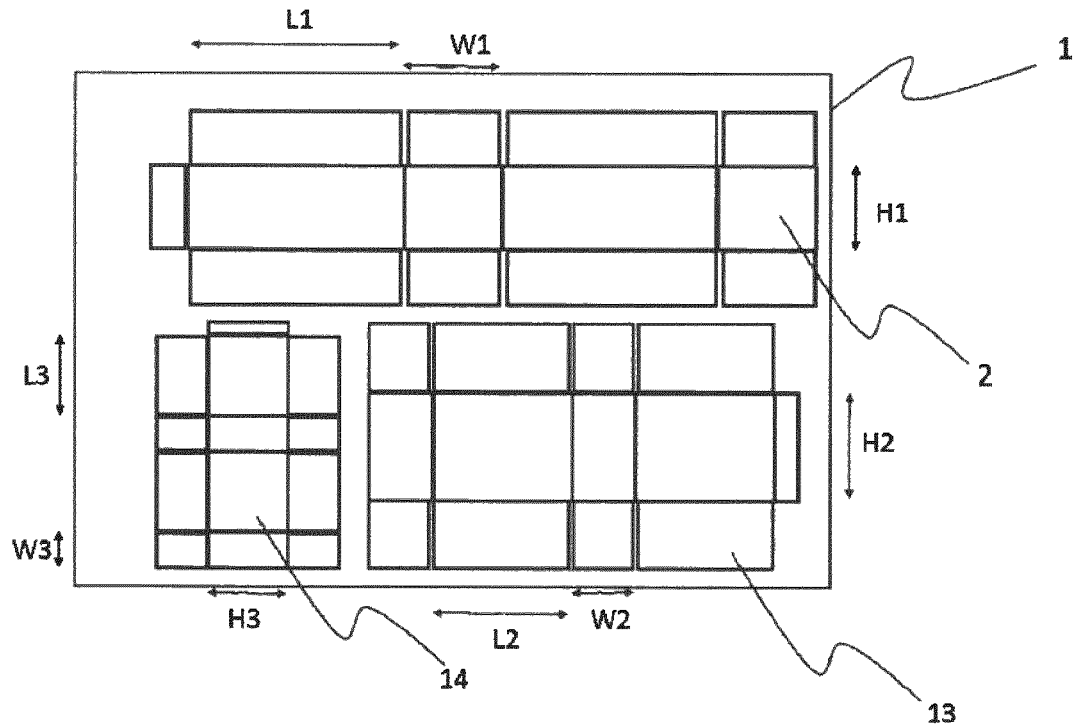
FIG. 3 illustrates how a packaging box layout 2 for manufacturing a packaging box with a length L1, a width W1 and a height H1, a second packaging box layout 13 for manufacturing a packaging box with a length L2, a width W2 and a height H2 and a third packaging box layout 14 for manufacturing a packaging box with a length L3, a width W3 and a height H3 may be fitted on a sheet of packaging material 1 in order to minimize waste of packaging material 1.
Figure 4:
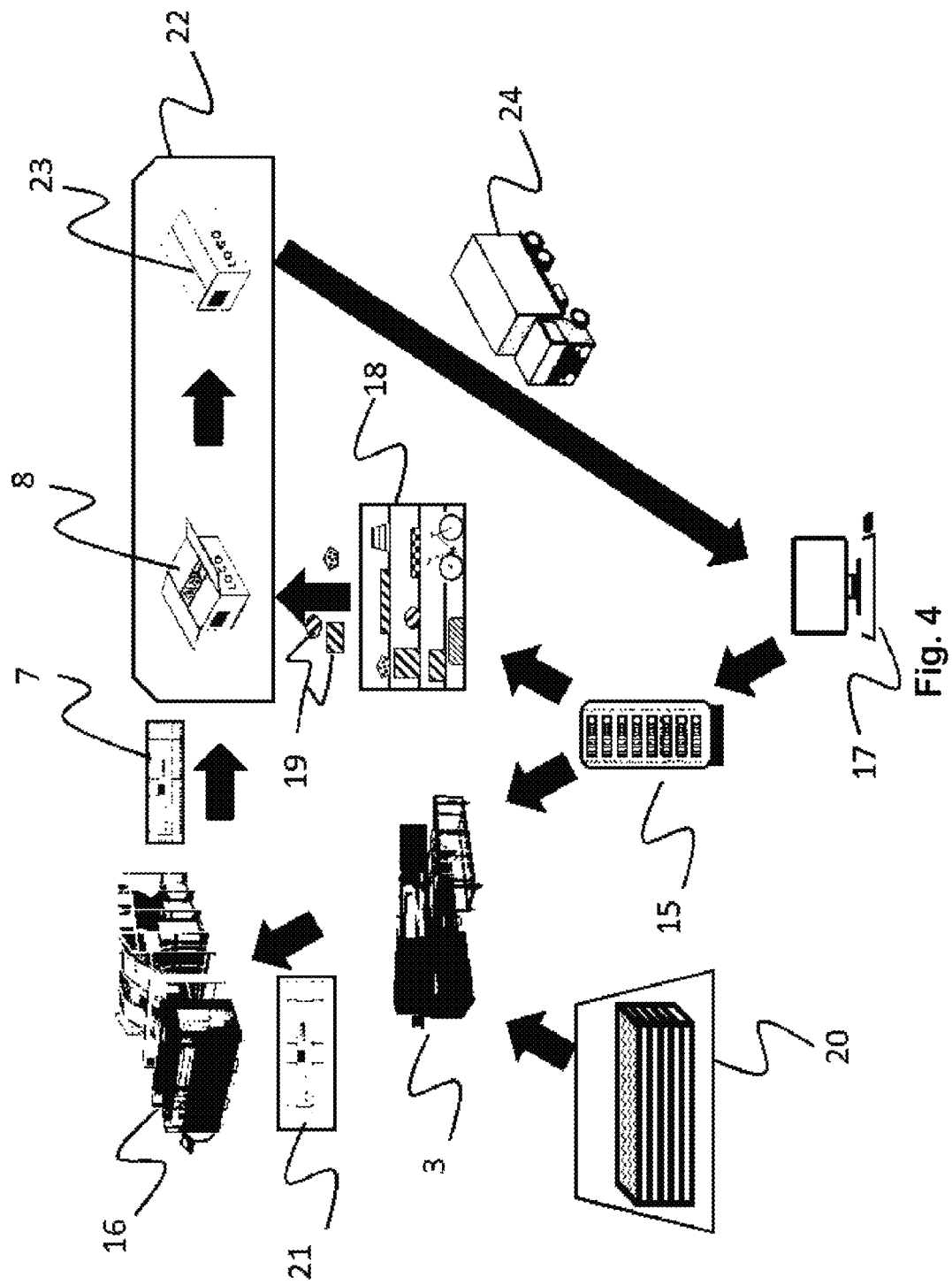
FIG. 4 illustrates a manufacturing line for packaging boxes of different dimensions including a computer server 15, an inkjet printer 3 and an apparatus for cutting and creasing 16. A customer places an online customer order 17 which is processed by a computer server 15. On request from the computer server 15, the availability of the merchandise articles 19 in a merchandise warehouse 18 is checked. A print order including at least the minimal packaging box dimensions for the available merchandise items 19 is sent to an inkjet printer 3 that prints an image according to the minimal packaging box dimensions on packaging material from a packaging material warehouse 20. The inkjet printed packaging material 21 is sent to an apparatus for cutting and creasing 16. The unassembled inkjet printed packaging box 7 is sent to a shipping center 22, where the available merchandise articles 19 are packed into the assembled inkjet printed packaging box 8. Thereafter, the package 23 containing the available merchandise articles 19 is transported from the shipping center 22 by a delivery vehicle 24 to the customer's residence or another desired address.

Another aspect of the invention is that multiple images for different packaging boxes may be printed on the same sheet of packaging material. The box layout for each box is then positioned on the packaging material in a nested manner (see FIG. 3), so that waste of packaging material in the cutting and creasing step c) is minimized.

There is no limitation on the specific digital printing technique, as long as variable data can be printed. For example, a digital printing technique based on electrophotography using toner or thermal transfer printing may be used. However, the digital printing is preferably performed by inkjet printing as it is a non-impact printing technology.

Non-impact is advantageous as corrugated board having a non-homogenous surface, due to waviness caused by the fluting and often a rough Kraft paper outer liner. Industrial inkjet printing systems have been developed providing variable data printing that makes short production runs and personalized products possible at low cost, while also their enhanced reliability allows incorporation into production lines.

In a preferred embodiment, one or more ink receiving layers are present on the side of the packaging material to be inkjet printed. The presence of one or more ink receiving layers allows to enhance the image quality of the inkjet printed image, especially when the inkjet inks are aqueous or solvent based inkjet inks.

For environmental and safety reasons, the inkjet inks are preferably aqueous inkjet inks. The one or more ink receiving layers preferably include a hydrophilic polymer, such as a polyvinylalcohol, so that the aqueous medium of the aqueous inkjet ink is readily absorbed by the one or more ink receiving layers and the colour pigments are immobilized on the surface of the one or more ink receiving layers.

In a preferred embodiment, the one or more ink receiving layers include an ink receiving layer including a hydrophilic polymer H and an inorganic pigment P in a weight ratio of H:P≤1:3.

In a more preferred embodiment, the packaging material includes multiple ink receiving layers and an outermost ink receiving layer contains no inorganic pigment or an amount of inorganic pigment smaller than that of one or more ink receiving layers located between the packaging material and the outermost ink receiving layer. The advantage of having an outermost layer with no or a small amount of pigment is that the creation of dust is minimized resulting in an enhanced reliability of the inkjet printing process.

A particularly preferred ink-receiving layer contains a polyvinylalcohol and an inorganic pigment, preferably a silica-based pigment.

In a preferred embodiment, the ink-receiving layer includes a polymeric binder selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; polyvinyl alcohol; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinyl-methyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar.

In a particularly preferred embodiment, the ink-receiving layer includes a polymeric binder, preferably a water soluble polymeric binder (>1 g/L water), which has a hydroxyl group as a hydrophilic structural unit, e.g. a polyvinyl alcohol.

A preferred polymer for the ink-receiving layer is a polyvinylalcohol (PVA), a vinylalcohol copolymer or a modified polyvinyl alcohol. The modified polyvinyl alcohol may be a cationic type polyvinyl alcohol, such as the cationic polyvinyl alcohol grades from Kuraray, such as POVAL C506, POVAL C118 from Nippon Goshei.

The pigment in the ink-receiving layer is an inorganic pigment, which can be chosen from neutral, anionic and cationic pigment types. Useful pigments include e.g. silica, talc, clay, hydrotalcite, kaolin, diatomaceous earth, calcium carbonate, magnesium carbonate, basic magnesium carbonate, aluminosilicate, aluminum trihydroxide, aluminum oxide (alumina), titanium oxide, zinc oxide, barium sulfate, calcium sulfate, zinc sulfide, satin white, alumina hydrate such as boehmite, zirconium oxide or mixed oxides.

In a preferred embodiment, (polymeric) cations in the ink-receiving layer are used in combination with aqueous inkjet inks containing anionic substances, such as an anionic polymeric dispersant. This results in "crashing" of the inkjet ink on the ink-receiving layer.

The inorganic pigment is preferably selected from the group consisting of alumina hydrates, aluminum oxides, aluminum hydroxides, aluminum silicates, and silicas.

Particularly preferred inorganic pigments are silica particles, colloidal silica, alumina particles and pseudo-boehmite, as they form better porous structures. When used herein, the particles may be primary particles directly used as they are, or they may form secondary particles. Preferably, the particles have an average primary particle diameter of 2 µm or less, and more preferably 200 nm or less.

In a preferred embodiment, the one or more ink-receiving layers have a total dry weight between 2.0 $g/m^2$ and 10.0 $g/m^2$, more preferably between 3.0 and 6.0 $g/m^2$.

The ink-receiving layer(s) can be coated onto the packaging material by any conventional coating technique, such as dip coating, knife coating, extrusion coating, spin coating, slide hopper coating and curtain coating.

Alternatively, the ink-receiving layer(s) can also be applied by printing techniques, such as flexographic printing or valvejet printing.

In another embodiment, the inkjet printing is performed using one or more pigmented inkjet inks containing a free radical polymerizable compound and a photoinitiator selected from the group consisting of an acylphosphine oxide compound, a thioxanthone compound and an α-hydroxy ketone compound. Such pigmented inkjet inks usually contain no water or solvent and are also addressed as UV curable pigmented inkjet inks. The UV curable pigmented inkjet inks jetted on the packaging material are exposed to UV light shortly after the ink landed on the packaging material. The photoinitiator absorbs UV light and generates radicals that initiate a polymerization reaction of the free radical polymerizable compounds. In this manner, the jetted ink is 'freezed' on the packaging material due to a rapid increase of the ink viscosity caused by the polymerization reaction. UV curable pigmented inkjet inks allows for inkjet printing without one or more ink receiving layers being present. However, one or more ink receiving layers are preferably present for improving image quality, when a substantial amount of the free radical polymerizable compound is replaced by water or organic solvents. The latter inks are addressed as hybrid UV curable inkjet inks, such as e.g. aqueous UV curable inkjet inks.

In another embodiment, a polyurethane or polyacrylate based latex binder is present in the one or more pigmented inkjet inks. When using aqueous inkjet inks this allows for the omission of the one or more ink receiving layers, as the latex binder binds the colorant to the packaging material. For aqueous UV curable pigmented inkjet inks, preferably the latex binder includes polymerizable groups, preferably (meth)acrylate groups, on the surface of the polymeric particles constituting the latex binder.

The digitally printed image on the packaging material is preferably covered by a varnish. A varnish is usually substantially colourless. The varnish provides the digital image with a certain scratch resistance and can also provide a glossy finish to the image.

The vanish may be applied by a suitable coating technique or by spraying. Alternatively, a printing technique such as flexography may be used. If the inkjet inks are UV curable, the varnish may also be digitally printed by inkjet on the image made by the UV curable inkjet inks.

After digital printing, a packaging box is cut from the packaging material according to the minimal packaging box dimensions and creased for allowing easy assembly of the packaging box.

Determining Minimal Packaging Box Dimensions

The minimal packaging box dimensions are determined by the one or more merchandise articles to be included into the packaging box. These merchandise articles are often themselves packed into a packaging having a rectangular cuboid shape. The length, width and height of this rectangular cuboid shape is used for determining the minimal packaging box dimensions. A few millimetres, e.g. 5 mm, are added to each of the length, width and height of this rectangular cuboid shape in order to obtain minimal packaging box dimensions. These extra millimeters allow for an easy entry of the merchandise article into the packaging box when making it ready for shipment.

The length, width and height of a rectangular cuboid shape can be measured with a ruler or tape measure. In order to gain efficiency, a scanning system may be used to accelerate the measurement of the length, width and height of a merchandise article. Or if multiple merchandise articles are to be included into the packaging box, the length, width and height of a compact arrangement of the multiple merchandise articles may be determined by scanning and the multiple merchandise articles are then subsequently included in the same arrangement into the packaging box.

In a particularly preferred embodiment, the outer dimensions for a certain merchandise article have been predetermined and are stored into a database of a computer server, where they can be retrieved when the merchandise article is ordered by a customer. This way the time-consuming process for repeatedly determining the minimal packaging box dimensions is avoided. In addition, when multiple merchandise articles are ordered, the computer server may even calculate an optimized arrangement of the multiple merchandise articles in the packaging box and provide the minimal packaging box dimensions to the inkjet printer, preferably including a visualization of the optimized arrangement of the multiple merchandise articles in the packaging box. This visualization can then be printed as an image on the packaging material for helping the shipping center to arrange the different merchandise articles into to the packaging box. This image may also help the customer to arrange the ordered merchandise articles into to the packaging box when he is dissatisfied and wants to return them.

Pre-determining the dimensions and storing them in a database is especially time-saving and efficient for merchandise articles having a shape different from a rectangular cuboid shape or even a totally irregular shape.

Digital Printing

Digital printing technology allows variable data printing, which is necessary to solve logistic problems as, for example, each packaging box may have a different destination address. The latter is currently solved by printing labels, but labels may detach from the packaging box, become unreadable or even be attached to the wrong packaging box.

Any suitable digital printing technique may be used, but it is preferably based on electrophotography or inkjet, most preferably inkjet. The latter is a non-impact printing technique having almost no restrictions on the type of packaging material used for making the packaging boxes.

A preferred print head for the inkjet printer is a piezo-electric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with inkjet ink or liquid. When the voltage is again removed, the ceramic expands to its original shape, ejecting a drop of ink from the print head.

A preferred piezoelectric print head is a so called push mode type piezoelectric print head, which has a rather large piezo-element capable of ejecting also high viscous inkjet ink droplets. Such a print head is available from RICOH as the GEN5s print head.

A preferred piezoelectric print head is a so-called through-flow piezoelectric drop-on-demand print head. Such a print head is available from TOSHIBA TEC, as the CF1ou print head, and also from RICOH and XAAR. Through-flow print heads are preferred in the present invention, because they enhance the reliability of inkjet printing.

The inkjet print head normally scans back and forth in a transversal direction across the moving ink-receiver surface. Often the inkjet print head does not print on the way back. Bi-directional printing is preferred for obtaining a high areal throughput. Such an inkjet printer is called a multi-pass inkjet printer.

Another preferred printing method is by a "single pass printing process", which can be performed by using page wide inkjet print heads or multiple staggered inkjet print heads that cover the entire width of the ink-receiving surface. In a single pass printing process, the inkjet print heads usually remain stationary and the ink-receiving surface is transported under the inkjet print heads.

When aqueous or solvent based inkjet inks are used, the inkjet printer includes a drying device to evaporate the water and solvents from the ink jetted on the packaging material. Suitable dryers include devices circulating hot air, ovens, and devices using air suction.

The drying device may include an infrared radiation source. An effective infrared radiation source has an emission maximum between 0.8 and 1.5 μm. Such an infrared radiation source is sometimes called a NIR radiation source or NIR dryer. NIR-radiation energy quickly enters into the depth of the inkjet ink layer and removes water and solvents out of the whole layer thickness, while conventional infrared and thermo-air energy predominantly is absorbed at the surface and slowly conducted into the ink layer, which results usually in a slower removal of water and solvents.

In a preferred embodiment, the NIR radiation source is in the form of NIR LEDs, which can be mounted easily on a shuttling system of a plurality of inkjet print heads in a multi-pass inkjet printers. Another preferred drying device uses Carbon Infrared Radiation (CIR).

When UV curable pigmented inkjet inks are used, the inkjet printer includes a UV curing device. The UV curing device emits UV radiation that is absorbed by the photoinitiator or photoinitiating system for polymerizing the polymerizable compounds of the core.

The UV curing device may include a high or low pressure mercury lamp, but preferably includes or consists of UV LEDs.

The UV curing device may be arranged in combination with the print head of the inkjet printer, travelling therewith so that the curing radiation is applied very shortly after jetting. Preferably such curing means consists of one or more UV LEDs, because in such an arrangement it can be difficult to provide other types of curing means that are small enough to be connected to and travelling with the print head. Alternatively, a static fixed radiation source may be employed, e.g. a source of curing UV-light, connected to the radiation source by means of flexible radiation conductive means, such as a fibre optic bundle or an internally reflective flexible tube, or by an arrangement of mirrors preferably including a mirror upon the print head.

However, it is not necessary to have the UV light source connected to the print head. The source of UV radiation may, for example, also be an elongated radiation source extending transversely across the ink on the packaging material to be cured. It may be adjacent to the transverse path of the print head so that subsequent rows of the decorative image formed by the print head are passed, stepwise or continually, beneath that radiation source.

Any ultraviolet light source, as long as part of the emitted light can be absorbed by the photoinitiator or photoinitiator system, may be employed as a radiation source, such as a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm, more preferably 360 to 400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

In a preferred embodiment, the inkjet printing device contains one or more UV LEDs with a wavelength larger than 360 nm, preferably one or more UV LEDs with a wavelength larger than 380 nm, and most preferably UV LEDs with a wavelength of about 395 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $N_2$ or $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

In a particularly preferred embodiment, the inkjet printing of the pigmented inkjet inks is performed in a multi-pass printing mode. Multi-pass printing is a technique used to reduce banding in inkjet printing. Dots of ink, when still in liquid form, tend to run together due to surface tension. This is referred to as coalescence. To print a high quality image, it is important to print individual round dots. But to achieve full saturated colours, the dots must overlap to completely cover the substrate. By only printing a portion of the image data so as to avoid simultaneously printing adjacent dots during each printing cycle, coalescence may be largely avoided. Additionally, by avoiding all horizontal adjacencies, the transverse speed of the printing mechanism can be increased up to two times the rated print speed of the print head. In a preferred embodiment, the number of passes used is 2 to 6 passes, more preferably no more than 4 passes.

Another advantage of using a multi-pass printing mode is that the pigmented inkjet inks are cured in consecutive passes, rather than in a single pass requiring a drying or curing device with a high energy input. The print head lifetime is also larger for multi-pass printing. While in single pass printing one side shooter is sufficient to replace the whole print head, in multi-pass printing side shooters and even failings can be tolerated. Also the cost of a multi-pass printer is usually much lower, especially for wide format packaging materials.

Cutting and Creasing

An apparatus provided with one or more operating stations configured to perform cutting and/or creasing on packaging material is well-known to the person skilled in packaging.

Recently, packaging machines have been developed to manufacture customized packaging boxes, so-called 'box-on-demand' systems. Such ' box-on-demand' packaging machines are exemplified by WO 2016/203343 A (PANOTEC) and EP 2697124 A (BOSCH).

The cutting may be performed by conventional means such as a die, but in the present invention preferably the cutting is performed by laser cutting. A laser is more flexible than conventional means for cutting packaging boxes of different sizes, resulting in a faster cutter process.

Images

There are no real limitations for the image to be digitally printed. A single colour or multiple colours may be used for digitally printing the image. It may be a single image or it may consist of multiple images or sub-images. For example, multiple images belonging to different packaging box layouts may be printed on packaging material in a nested array as exemplified in FIG. 3, where the imaginary box layouts are shown, that can also be digitally printed if desired.

The image is digitally printed according to the minimal packaging box dimensions. This way it is prevented that part of the image is not undesirably cut out in step c) or that the image is not positioned in the right location of the finished package.

There is also no real limitation on the content of the image. It may contain decorative features, company logo's, trademarks, photographs, drawings and cartoons and/or information. The information may be human readable, such as text, or it may be machine readable, such as a bar code, or a combination of both.

The image preferably contains one or more machine readable codes, more preferably multiple machine readable codes. These multiple machine readable codes may be different or the same. By using multiple identical machine readable codes on different surfaces of the package, the case where problems occur due to a damaged machine readable code being unreadable can be avoided as usually an intact machine readable code remains readable on a different surface of the package.

There is no restriction on the type of machine readable code or the information it contains. It may be a simple bar code, but it may also be a so-called 2D code. Preferred 2D codes include a QR code, a datamatrix code, a cool-datamatrix code, an aztec code, an upcode, a trillcode, a quickmark code, a shot code, a mcode, and a beetagg.

The information present in the machine code may be the required information or it may be a link for retrieving the information from a source, such as a database or the internet.

There is also no limitation on the content of human readable information, which may include, for example, the destination address of the package, a message for customer engagement, packaging instructions, and a list of merchandise articles packed or to be packed into the packaging box.

The destination address may be to the customer's residence or another desired address. The same information may also be present as such or as a computer link in the machine readable code.

Packaging instructions may be included in the image and can contain, for example, the list of the merchandise articles to be included into the packaging box or instructions on how to arrange the merchandise articles in the packaging box.

The image may also contain a communication for enhancing the customer engagement. Customer engagement is the depth of the relationship a customer has with a company or brand. As the competition between e-commerce companies is strong, these e-commerce companies are constantly investigating ways, other than during the online connection made when ordering the merchandise articles, to enhance customer experience and customer engagement. Today, a packaging box has a rather dull appearance carrying usually only the shipping center company logo. The free space on outer surface of the packaging box could, for example, be sold as advertisement space to the manufacturer(s) of the merchandise articles included in the packaging box. Such advertisement could suggest the sale of, for example, accessories suitable for the ordered merchandise articles. For example, the suggestion of earphones on sale for an ordered smartphone. Advertisements could also be digitally printed for merchandise articles that were looked at, but finally not ordered by the customer.

An image for enhancing customer engagement may also contain a machine readable code, such as a QR-code, which after scanning by the smartphone of a customer leads to a website of the merchandise article manufacturer for enhancing the customer experience.

The free space on the packaging box could also be used to enhance customer engagement. A physical retail shop often provides customer fidelity cards upon sale of merchandise, in order to promote future sale of similar or other merchandise articles at a reduced price. A similar system is today set up by the e-commerce company to offer a discount on a future order of the customer by sending an e-mail to the customer. However, this e-mail is often simply deleted or ended up in the spam-folder. By digitally printing this customer engagement offer on the packaging box, a larger sales effect may be expected, as the customer is often more excited and enthusiastic upon opening the just received packaging box than upon opening an e-mail.

Use of Machine Readable Codes

The advantages of machine readable codes were already touched upon in the previous chapter on "images".

In a preferred embodiment of the present invention, the machine readable code that is digitally printed on packaging material for a packaging box having minimal packaging box dimensions based on outer dimensions of one or more merchandise articles packaged or to be packaged into the packaging box, is preferably used for at least one of the following purposes:

a) identifying one or more merchandise articles to be enclosed in an empty packaging box; b) identifying the destination address of the packaging box; c) delivering the packaging box to a shipping center; d) delivering the packaging box to a delivery vehicle; e) delivering the packaging box containing one or more merchandise articles to the destination address; f) returning the packaging box with one or more merchandise articles to a return address; g) tracking progress of delivery of the packaging box containing one or more merchandise articles; h) retrieving information from the internet on one or more merchandise articles in the packaging box; i) authentication of the packaging box containing one or more merchandise articles; j) authentication of the one or more merchandise articles in the packaging box; and k) enhancing customer engagement.

Manufacturing Line

Another aspect of the invention, is a manufacturing line for packaging boxes of different dimensions including: a) a computer server 15 for providing minimal packaging box dimensions based on the outer dimensions of one or more merchandise articles to be packaged into a packaging box; b) a digital printer 3 for printing an image on packaging material according to the minimal packaging box dimensions; and c) an apparatus for cutting and creasing 16 according to the minimal packaging box dimensions. The digital printer is preferably an inkjet printer, more preferably a multi-pass inkjet printer.

The computer server 15 operates a program. Part or whole of the computer server and/or the functional units or blocks thereof may be implemented in one or more circuits or circuitry, such as an integrated circuit(s) or as an LSI (large scale integration). Each functional unit or block of the computer server may be individually made into an integrated circuit chip. Alternatively, part or whole of the functional units or blocks may be integrated and made into an integrated circuit chip.

A program which is operated in the computer server is a program controlling a processor in order to realize functions of the various preferred embodiments according to the present invention. Therefore, information which is handled by the computer server is temporarily accumulated in a RAM at the time of the processing. Thereafter, the information may be stored in various types of circuitry in the form of ROMs and HDDs, and read out by circuitry within, or included in combination with, the computer server as necessary, and modification or write-in is performed thereto. As a recording medium storing the program, any one of a semiconductor medium (for example, the ROM, a non-volatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions of the various preferred embodiments of the present invention are not only realized, but the functions of preferred embodiments of the present invention may be realized by processing the loaded program in combination with an operating system or other application programs, based on an instruction of the program.

Moreover, in a case of being distributed in a market, the program can be distributed by being stored in the portable recording medium, or the program can be transmitted to a server computer which is connected through a network such as the Internet. In addition, a portion of a terminal device, a wireless base station, a host system, or other devices, or the whole thereof may be realized as an LSI which is typically an integrated circuit. Each functional unit or block of the computer server may be individually chipped, or a portion thereof, or the whole thereof may be chipped by being integrated. In a case of making each functional block or unit as an integrated circuit, an integrated circuit controller that controls the integrated circuits, is added.

Finally, it should be noted that the description referring to "circuit" or "circuitry" is in no way limited to an implementation that is hardware only, and as persons of ordinary skill in the relevant art would know and understand, such descriptions and recitations of "circuit" or "circuitry" include combined hardware and software implementations in which the circuit or circuitry is operative to perform functions and operations based on machine readable programs, software or other instructions in any form that are usable to operate the circuit or circuitry.

Digital connections with the computer server may be made in any form. It can be a physical connection, such as an optical fiber, or a wireless connection, such as a wifi connection, for example according to the IEEE 802.11 standard.

Digital connections may be made for various reasons, such as the order placement by the customer, checking the availability of a merchandise article in the merchandise warehouse, sending a print order file to an inkjet printer, providing packaging instructions, etc.

Packaging Material

There is no restriction on the packaging material as long as it is suitable to manufacture a packaging box from it. Preferred packaging materials are low cost and lightweight. Lightweight packaging material reduces transportation costs and facilitates the handling during delivery to the customer.

A particular preferred packaging material is corrugated card board as it is low cost and lightweight, but also has the benefit that corrugated cardboard boxes are stackable, making them easy to store and transport.

Corrugated cardboard is a packaging material formed by gluing one or more fluted sheets of paperboard (corrugating medium) to one or more flat sheets (called facings) of linerboard. Its comes in four common types: (1) Single face: one fluted sheet glued to one facing (total two sheets). (2) Single wall: one fluted sheet sandwiched between two facings (total three sheets); also called double face or single ply. (3) Double wall: one single-face glued to one single wall so that two fluted sheets are alternatively sandwiched between three flat sheets (total five sheets); also called double cushion or double ply. (4) Triple wall: two single-face glued to one single wall so that three fluted sheets are alternatively sandwiched between four flat sheets (total seven sheets); also called triple ply. The preferred corrugated cardboard in the present invention is single wall or double wall, more preferably single wall corrugated cardboard as this is sufficiently strong and easy to crease. Single face corrugated cardboard generally has insufficient strength to hold the merchandise articles, while triple wall cardboard is often more difficult to crease into a packaging box.

The strength of cardboard is important for deliverability, as if merchandise doesn't arrive intact in the hands of your customers, you risk your reputation with them.

The cardboard can come in a variety of constructions, such as e.g. honeycomb cardboard, however for easy creasing preferably a cardboard using a paper fluting medium is used.

The paper used in corrugated card board, such as Kraft paper, has often a brownish colour. In a preferred embodiment of the corrugated cardboard, the outer surface of the outer paper liner 11 (see FIG. 3) has a white colour for enhancing the colour vibrancy of the inkjet inks printed thereon. The white colour background contributes to the customer experience as the customer regards this as a more luxurious product. Alternatively the white background may be applied as a layer by coating or printing prior to inkjet printing.

Another advantage of a paper based cardboard is the recyclability.

However, for some merchandise it may be sensible to use corrugated plastic. Corrugated plastic is a waterproof, versatile material that can be die cut in the same way as corrugated cardboard. Light weight and durable, this material also has a longer shelf life than cardboard and is better at holding out moisture, such as snow and rain.

Inkjet Inks

The inkjet ink contains a colorant, which may be a dye or a colour pigment. The inkjet inks are preferably pigmented inkjet inks as the use of colour pigments provide higher light stability than dyes.

An aqueous inkjet ink preferably includes at least a colour pigment and water, more preferably completed with one or more organic solvents such as humectants, and a dispersant if the colour pigment is not a self-dispersible colour pigment.

A UV curable inkjet ink preferably includes at least a colour pigment, a polymeric dispersant, a photoinitiator and a polymerizable compound, such as a monomer or oligomer.

If multi-colour images are desired, the inkjet inks are composed into an inkjet ink set having differently coloured inkjet inks. The inkjet ink set is preferably a CMYK inkjet ink set. The inkjet ink set may be extended with extra inks such as white, brown, red, green, blue, and/or orange to further enlarge the colour gamut of the image. The inkjet ink set may also be extended by the combination of the full density inkjet inks with light density inkjet inks. The combination of dark and light colour inks and/or black and grey inks improves the image quality by providing a lowered graininess.

Colorants

The colorant in an inkjet ink may include a dye, but preferably consists of a colour pigment. The pigmented inkjet ink preferably contains a dispersant, more preferably a polymeric dispersant, for dispersing the pigment. In addition to the polymeric dispersant, the pigmented inkjet ink may contain a dispersion synergist to further improve the dispersion quality and stability of the ink.

In a pigmented aqueous inkjet ink, the aqueous inkjet ink may contain a so-called "self dispersible" colour pigment. A self-dispersible colour pigment requires no dispersant, because the pigment surface has ionic groups which realize electrostatic stabilization of the pigment dispersion. In case of self-dispersible colour pigments, the steric stabilization obtained by using a polymeric dispersant becomes optional. The preparation of self-dispersible colour pigments is well-known in the art and can be exemplified by EP 904327 A (CABOT).

The colour pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

A particularly preferred pigment for a cyan inkjet ink is a ß-copper phthalocyanine pigment, more preferably C.I. Pigment Blue 15:3 or C.I. Pigment Blue 15:4.

Particularly preferred pigments for a magenta inkjet ink are quinacridone pigments, diketopyrrolopyrrole pigments and mixed crystals thereof.

Particularly preferred pigments for yellow inkjet ink are C.I. Pigment Yellow 74, C.I. Pigment Yellow 120, C.I. Pigment Yellow 150, C.I. Pigment Yellow 155, C.I. Pigment Yellow 180 and C.I. Pigment Yellow 213, and mixed crystals thereof.

For the black ink, the particularly preferred pigment is a carbon black.

A preferred inkjet ink set is an ink set containing a cyan, a magenta, a yellow and a black inkjet ink is an ink set where the colour pigments are the particularly preferred pigments of the previous four paragraphs.

Suitable black pigments include Regal™ 400R, Mogul™ L, Elftex™ 320 from Cabot Co., or Carbon Black FW18, Special Black™ 250, Special Black™ 350, Special Black™ 550, Printex™ 25, Printex™ 35, Printex™ 55, Printex™ 90, Printex™ 150T from DEGUSSA Co., MA8 from MITSUBISHI CHEMICAL Co., and C.I. Pigment Black 7 and C.I. Pigment Black 11.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, the inkjet ink includes a carbon black pigment and at least one pigment selected from the group consisting of a blue pigment, a cyan pigment, magenta pigment and a red pigment. It was found that such a black inkjet ink allowed easier and better colour management as it provides a neutral black colour.

The pigment particles in the pigmented inkjet ink should be sufficiently small to permit free flow of the ink through the inkjet printing device, especially at the ejecting nozzles. It is also desirable to use small particles for maximum colour strength and to slow down sedimentation.

The average particle size of the pigment in the pigmented inkjet ink is preferably between 50 nm and 250 nm, more preferably 70 to 200 nm.

The pigment used in the pigmented inkjet ink is preferably present in an amount of 1.0 to 10.0 wt %, preferably 1.5 to 6 wt %, and most preferably 2 to 5 wt % based on the total weight of the pigmented inkjet ink. For a light inkjet ink, the pigment is preferably present in an amount of 0.1 to 0.9 wt % based on the total weight of the pigmented inkjet ink.

Dispersants

The pigmented inkjet ink may contain a dispersant, preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from ZENECA. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

Particularly preferred polymeric dispersants for UV curable inkjet inks include Solsperse™ dispersants from NOVEON, Efka™ dispersants from CIBA SPECIALTY CHEMICALS INC and Disperbyk™ dispersants from BYK CHEMIE GMBH. Particularly preferred dispersants are Solsperse™ 32000, 35000 and 39000 dispersants from NOVEON.

Polymer Latex Binders

Aqueous inkjet inks may contain a polymeric latex binder. By using such a latex, the one or more ink receiving layers on a paper substrate can be omitted with only minor loss in image quality.

The polymer latex is not particularly limited as long as it has stable dispersibility in the ink composition. There is no limitation on the main chain skeleton of the water-insoluble polymer. Examples of the polymer include a vinyl polymer and a condensed polymer (e.g., an epoxy resin, polyester, polyurethane, polyamide, cellulose, polyether, polyurea, polyimide, and polycarbonate). Among the above, a vinyl polymer is particularly preferable because of easily controlled synthesis.

In a particularly preferred embodiment the polymer latex binder is a polyurethane or a polyacrylate based latex binder.

The polymer latex is preferably a self-dispersing polymer latex, and more preferably a self-dispersing polymer latex having a carboxyl group, from the viewpoint of ejecting stability and dispersion stability of the inkjet ink. The self-dispersing polymer latex means a latex of a water-insoluble polymer that does not contain a free emulsifier and that can get into a dispersed state in an aqueous medium even in the absence of other surfactants due to a functional group (particularly, an acidic group or a salt thereof) that the polymer itself has.

If the UV curable pigmented inkjet ink is an aqueous UV curable ink, then a polymer latex may be included. This polymer latex binder preferably includes polymerizable groups, such as acrylate groups, on its surface. A UV curable polymer latex allows for crosslinking between the polymeric latex particles.

Biocides

The aqueous inkjet ink preferably includes a biocide to prevent ink deterioration during storage by micro-organisms present in the water of the inkjet ink.

Suitable biocides for the aqueous inkjet inks include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added in an amount of 0.001 to 3.0 wt. %, more preferably 0.01 to 1.0 wt. %, each based on the total weight of the aqueous inkjet ink.

Humectants

A humectant is used in the aqueous inkjet ink to prevent water evaporation from a nozzle in the inkjet print head that can result in a failing nozzle due to clogging.

Suitable humectants include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are 2-pyrrolidone, glycerol and 1,2-hexanediol, since the latter were found to be the most effective for improving inkjet printing reliability in an industrial environment.

The humectant is preferably added to the inkjet ink formulation in an amount of 0.1 to 40 wt % of the formulation, more preferably 1 to 30 wt % of the formulation, and most preferably 3 to 25 wt % of the formulation.

pH Adjusters

The aqueous inkjet inks may contain at least one pH adjuster. Suitable pH adjusters include NaOH, KOH, NEt$_3$, NH$_3$, HCl, HNO$_3$, H$_2$SO$_4$ and (poly)alkanolamines such as triethanolamine and 2-amino-2-methyl-1-propaniol. Preferred pH adjusters are triethanol amine, NaOH and H$_2$SO$_4$.

For dispersion stability, the aqueous inkjet ink preferably has a pH of at least 7.

Surfactants

The inkjet inks may contain at least one surfactant. The surfactant(s) can be anionic, cationic, non-ionic, or zwitterionic and are usually added in a total quantity less than 5 wt % based on the total weight of the inkjet ink and particularly in a total less than 2 wt % based on the total weight of the inkjet ink.

The inkjet inks preferably have a surface tension between 18.0 and 45.0 mN/m at 25° C., more preferably between a surface tension between 21.0 and 39.0 mN/m at 25° C.

Preferred surfactants are selected from fluoro surfactants (such as fluorinated hydrocarbons) and/or silicone surfactants.

The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes. Preferred commercial silicone surfactants include BYK™ 333 and BYK™ UV3510 from BYK Chemie.

Preferred surfactants for the aqueous inkjet inks include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Silicone surfactants are often preferred in UV curable inkjet inks, especially the reactive silicone surfactants, which are able to be polymerized together with the polymerizable compounds during the curing step.

Examples of useful commercial silicone surfactants are those supplied by BYK CHEMIE GMBH (including Byk™-302, 307, 310, 331, 333, 341, 345, 346, 347, 348, UV3500, UV3510 and UV3530), those supplied by TEGO CHEMIE SERVICE (including Tego Rad™ 2100, 2200N, 2250, 2300, 2500, 2600 and 2700), Ebecryl™ 1360 a polysiloxone hexaacrylate from CYTEC INDUSTRIES BV and Efka™-3000 series (including Efka™-3232 and Efka™-3883) from EFKA CHEMICALS B.V.

Polymerizable Compounds

A UV curable inkjet ink includes a polymerizable compound, preferably one or more monomers and/or oligomers. The UV curable inkjet ink is preferably a free radical UV curable inkjet ink.

Any monomer and oligomer capable of free radical polymerization may be used in the free radical UV curable inkjet ink. The monomers and oligomers may have different degrees of polymerizable functionality, and a mixture including combinations of mono-, di-, tri- and higher polymerizable functionality monomers may be used. The viscosity of the UV curable inkjet ink can be adjusted by varying the ratio between the monomers and oligomers.

Particularly preferred for use as a polymerizable compound in the UV curable inkjet ink are monofunctional and/or polyfunctional (meth)acrylate monomers, oligomers or prepolymers and N-vinylamides, such as N-vinylacaprolactam and acryloylmorpholine.

Photoinitiators

The UV curable pigment inkjet inks preferably contains a photoinitiator. The initiator typically initiates the polymerization reaction. The photo-initiator may be a Norrish type I initiator, a Norrish type II initiator or a photo-acid generator, but is preferably a Norrish type I initiator, a Norrish type II initiator or a combination thereof.

A preferred Norrish type I-initiator is selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and α-halophenylglyoxalates.

A preferred Norrish type II-initiator is selected from the group consisting of benzophenones, thioxanthones, 1,2-diketones and anthraquinones.

Suitable photo-initiators are disclosed in CRIVELLO, J. V., et al. VOLUME III: Photoinitiators for Free Radical Cationic & Anionic Photopolymerization. 2nd edition. Edited by BRADLEY, G. London, UK: John Wiley and Sons Ltd, 1998. p. 287-294.

A preferred amount of photoinitiator is 0.3-20 wt % of the total weight of the UV curable inkjet ink, more preferably 1-15 wt % of the total weight of the UV curable inkjet ink.

In order to increase the photosensitivity further, the free radical UV curable inkjet ink may additionally contain co-initiators.

A preferred co-initiator is selected from the group consisting of an aliphatic amine, an aromatic amine and a thiol. Tertiary amines, heterocyclic thiols and 4-dialkylaminobenzoic acid are particularly preferred as co-initiator. The most preferred co-initiators are aminobenzoates for reason of shelf-life stability of the inkjet ink.

The amount of co-initiator or co-initiators is preferably from 0.1 to 20.0 wt %, more preferably from 1.0 to 10.0 wt %, based in each case on the total weight of the UV curable inkjet ink.

Polymerization Inhibitors

For improving the shelf-life of the inkjet ink, the UV curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total (inkjet) ink.

Preparation of Inkjet Inks

The inkjet inks may be prepared by precipitating or milling the colour pigment in the dispersion medium in the presence of the polymeric dispersant, or simply by mixing a self-dispersible colour pigment in the ink.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

If the inkjet ink contains more than one pigment, the colour ink may be prepared using separate dispersions for each pigment, or alternatively several pigments may be mixed and co-milled in preparing the dispersion.

The dispersion process can be carried out in a continuous, batch or semi-batch mode. UV curable inkjet inks are preferably prepared under conditions eliminating all possible incident UV light.

The preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water or a monomer. For inkjet inks, the pigment is usually present in the mill grind at 1 to 50 wt %, excluding the milling media. The weight ratio of pigment over dispersant is 2:1 to 1:2.

The milling time can vary widely and depends upon the pigment, mechanical means and residence conditions selected, the initial and desired final particle size, etc. In the present invention pigment dispersions with an average particle size of less than 150 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general, it is desirable to make the colour ink in the form of a concentrated mill grind, which is subsequently diluted to the appropriate concentration for use in the inkjet printing system. This technique permits preparation of a greater quantity of pigmented ink from the equipment. If the mill grind was made in a solvent, it is diluted with water or other solvents to the appropriate concentration. If it was made in water, it is diluted with either additional water or water miscible solvents to make a mill grind of the desired concentration. By dilution, the ink is adjusted to the desired viscosity, colour, hue and saturation density.

REFERENCE SIGNS LIST

TABLE 1

| | |
|---|---|
| 1 | Packaging material |
| 2 | Packaging box layout |
| 3 | Inkjet Printer |
| 4 | Warning pictograms |
| 5 | Machine readable code |
| 6 | Company logo |
| 7 | Inkjet printed packaging box |
| 8 | Assembled inkjet printed packaging box |
| 9 | Paper inner liner |
| 10 | Paper fluting medium |
| 11 | Paper outer liner |
| 12 | Glue |
| 13 | Second packaging box layout |
| 14 | Third packaging box layout |
| 15 | Computer server |
| 16 | Apparatus for cutting and creasing |
| 17 | Online customer order |
| 18 | Merchandise warehouse |
| 19 | Merchandise articles |
| 20 | Packaging material warehouse |
| 21 | Inkjet printed packaging material |
| 22 | Shipping center |
| 23 | Package |
| 24 | Delivery vehicle |

The invention claimed is:

1. A method of manufacturing a packaging box including, in order, the steps of:
   a) determining minimal packaging box dimensions based on outer dimensions of one or more merchandise articles to be packaged into the packaging box;
   b) digitally printing multiple images according to different packaging box dimensions for different packaging boxes on a packaging material; and
   c) cutting and creasing the different packaging boxes from the packaging material according to the minimal packaging box dimensions;
   wherein the multiple images belong to different packaging box layouts and the box layout for each box is positioned on the packaging material in a nested manner.

2. The manufacturing method of claim 1, wherein the images contain one or more machine readable codes.

3. The manufacturing method of claim 1, wherein the images contain one or more of:
   a) a destination address of the one or more merchandise articles;
   b) a communication for enhancing customer engagement; and
   c) a list of the one or more merchandise articles to be packaged into the packaging box.

4. The manufacturing method of claim 1, wherein the digital printing is performed by inkjet printing using one or more pigmented inkjet inks.

5. The manufacturing method of claim 4, wherein one or more ink receiving layers are present on a side of the packaging material to be inkjet printed.

6. The manufacturing method of claim 5, wherein the one or more ink receiving layers include an ink receiving layer including a hydrophilic polymer H and an inorganic pigment P in a weight ratio of $H:P \leq 1:3$.

7. The manufacturing method of claim 5, wherein the one or more pigmented inkjet inks printed on the one or more ink receiving layers are aqueous pigmented inkjet inks.

8. The manufacturing method of claim 4, wherein the inkjet printing is performed using one or more pigmented inkjet inks containing a free radical polymerizable compound and a photoinitiator selected from the group consisting of an acylphosphine oxide compound, a thioxanthone compound, and an α-hydroxy ketone compound.

9. The manufacturing method of claim 4, wherein a polyurethane or polyacrylate based latex binder is present in the one or more pigmented inkjet inks.

10. The manufacturing method of claim 1, wherein the images are covered by a varnish.

11. The manufacturing method of claim 1, wherein the packaging material is corrugated cardboard.

* * * * *